US011928938B2

(12) United States Patent
Huke et al.

(10) Patent No.: US 11,928,938 B2
(45) Date of Patent: Mar. 12, 2024

(54) AT-BAT/PER DRIVE WAGERING

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

(21) Appl. No.: 17/375,284

(22) Filed: Jul. 14, 2021

(65) Prior Publication Data

US 2022/0148389 A1 May 12, 2022

Related U.S. Application Data

(60) Provisional application No. 63/111,212, filed on Nov. 9, 2020.

(51) Int. Cl.
*G07F 17/32* (2006.01)
*G06Q 50/34* (2012.01)

(52) U.S. Cl.
CPC ......... *G07F 17/3288* (2013.01); *G06Q 50/34* (2013.01); *G07F 17/323* (2013.01)

(58) Field of Classification Search
CPC .... G07F 17/323; G07F 17/3288; G06Q 50/34
See application file for complete search history.

(56) References Cited

U.S. PATENT DOCUMENTS

2007/0293289 A1 12/2007 Loeb
2017/0018145 A1 1/2017 Shore et al.
2017/0113148 A1 4/2017 Ballman
2018/0158286 A1 6/2018 Strause et al.
2019/0122482 A1 4/2019 Amaitis et al.
2020/0334959 A1 10/2020 Nelson et al.
2021/0319171 A1* 10/2021 Wallace ................ G06F 40/123

OTHER PUBLICATIONS

International Search Report and Written Opinion dated Feb. 3, 2022, in connection with corresponding International Patent Application No. PCT/US2021/058627; 12 pages.

* cited by examiner

*Primary Examiner* — James S. McClellan
*Assistant Examiner* — Ross A Williams
(74) *Attorney, Agent, or Firm* — Maier & Maier, PLLC

(57) ABSTRACT

A micro market focused on which batters will bat in an inning, for example, a very high price on the ninth man due up in an inning, but a low price for the fourth batter. This approach is a variation of betting on the number of plays in a football drive.

13 Claims, 2 Drawing Sheets

Next plays wager module

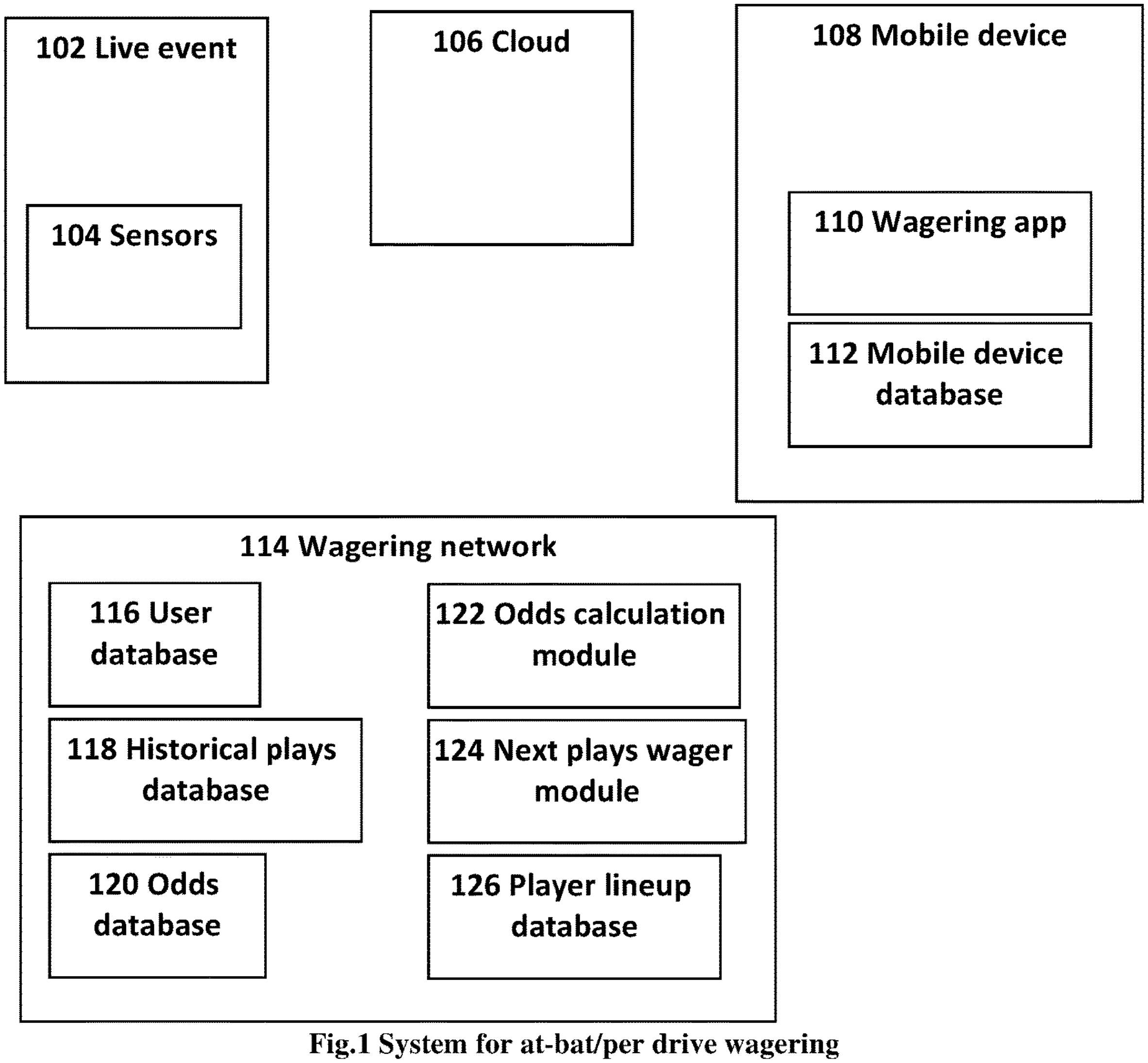
Fig.1 System for at-bat/per drive wagering

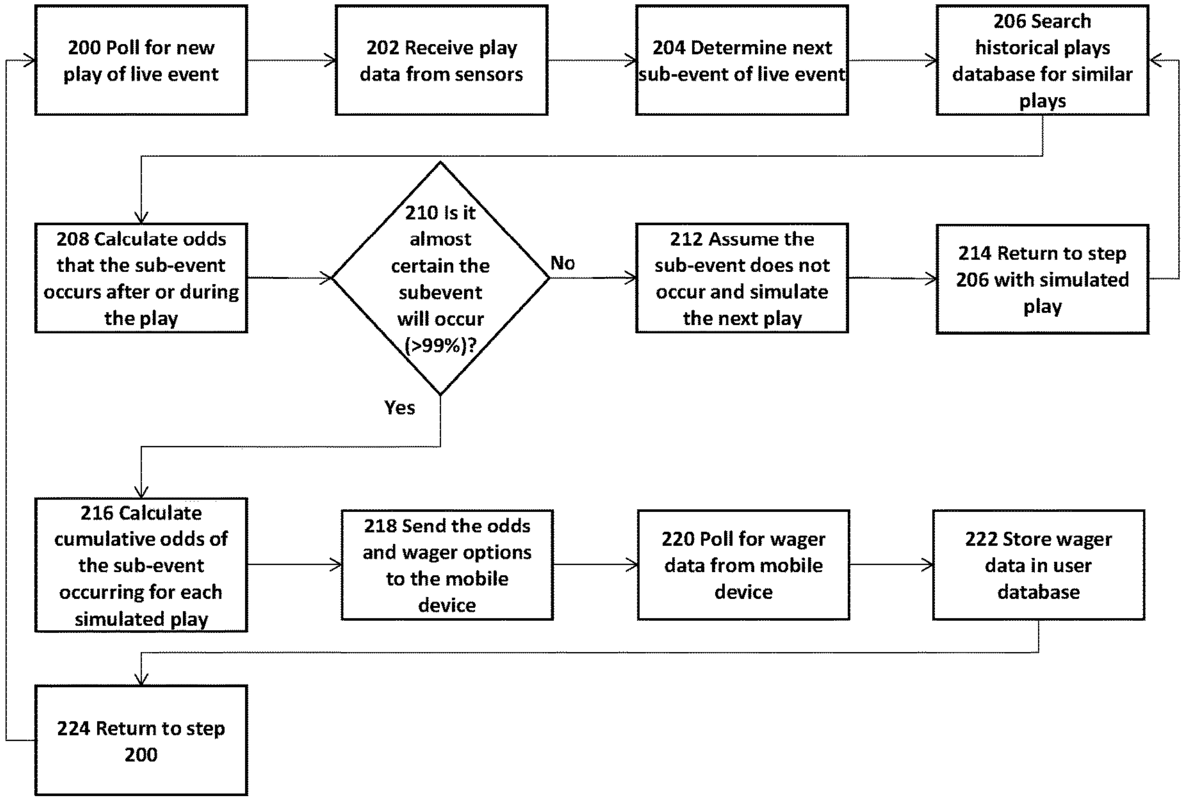
Fig.2 Next plays wager module
| Lineup Number | Player |
|---|---|
| 1 | Cedric Mullins |
| 2 | Austin Hays |
| 3 | Trey Mancini |
| - | - |
| - | - |
Fig.3 Player lineup database

AT-BAT/PER DRIVE WAGERING

FIELD

The embodiments are generally related to play-by-play wagering on live sporting events.

BACKGROUND

Wagering on the outcome of plays of a live sporting event, or micro-betting, is a growing market facilitated by advancing odds calculation speeds. Traditional betting on sporting events is usually done far in advance and based on entire outcomes such as which team wins, the point spread, which team is ahead at half-time, etc.

Between these two extremes is a form of betting based on more than one play but still requires fast odds calculation with real-time data. One of these types of multi-play wagers is "per-drive" wagering or wagering on the number of plays before an event occurs. "Per-drive" refers to American football games where a drive is a series of plays when the offense has the football until it punts or scores and the other team gets possession of the ball.

The main issue with this type of wagering is that it changes with the state of the live sporting event and requires live data and requires odds calculations to simulate possible future plays.

SUMMARY

Methods and systems for wagering. In one embodiment, a method for offering play count wagers in a play-by-play sports betting network may be provided. The method can include collecting real-time sensor data from a live sporting event; extracting historical data similar to the real-time sensor data from a historical database; calculating the probability of at least one sub-event occurring during at least one play in the live event based off the historical data and real-time sensor data; and outputting a wager on a wagering device that is communicatively coupled to a wagering network, wherein the wager outputted on the wagering device is a wager on whether one or more of the at least one sub-events will occur during the at least one play in the live event.

In another embodiment a system for offering play count wagers in a play-by-play sports betting network can include a live sporting event upon which play-by-play wagers can be placed; one or more sensors that collect data from the live event; at least one wagering device; a wagering network communicatively coupled with the at least one wagering device; a historical plays database which contains play data for the type of sport being played in the live sporting event; and a next plays wager module which calculates the probability of at least one sub-event occurring during at least one play in the live event based off historical play data and real-time sensor data; where a wager can be placed on the at least one wagering device communicatively coupled with the wagering network on whether one or more of the at least one sub-events will occur during the at least one play in the live event.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the FIGS. represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1: illustrates a system for at-bat/per drive wagering, according to an embodiment.

FIG. 2: illustrates a next plays wager module, according to an embodiment.

FIG. 3: illustrates a player lineup database, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of the terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both pitchers are scheduled to start a game start. If they do not, the bet is deemed "no action" and refunded. The "run line" in baseball refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations, or individuals that would deploy, for fees, and maybe part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling, and (4) customer service assistance. These managed service compliance services can be integrated into the embodiments in a variety of manners.

Managed service pricing and trading service is a service that helps customers with (1) official data feeds, (2) data visualization, and (3) land-based, on-property digital signage. These managed service pricing and trading services can be integrated into the embodiments in a variety of manners.

Managed service and technology platforms are services that help customers with (1) web hosting, (2) IT support, and (3) player account platform support. These managed service and technology platform services can be integrated into the embodiments in a variety of manners.

Managed service and marketing support services are services that help customers (1) acquire and retain clients and users, (2) provide for bonusing options, and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for the integration of global and local payment methods. These payment processing services can be integrated into the embodiments in a variety of manners.

Engaging promotions allow customers to treat your players to free bets, odds boosts, enhanced access, and flexible cashback to boost lifetime value. Engaging promotions can be integrated into the embodiments in a variety of manners.

"Cash out" or "payout" or "payout" allow customers to make available, on singles bets or accumulated bets with a partial cash-out where each operator can control payouts by always managing commission and availability. The "cash-out" or "payout" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers, clients, and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers manage sports gaming. Business Applications can be integrated into the embodiments in a variety of manners.

State-based integration allows for a given sports gambling game to be modified by states in the United States or other countries, based upon the state the player is in, based upon mobile phone or other geolocation identification means. State-based integration can be integrated into the embodiments in a variety of manners.

Game Configurator allows for the configuration of customer operators to have the opportunity to apply various chosen or newly created business rules on the game as well as to parametrize risk management. The Game Configurator can be integrated into the embodiments in a variety of manners.

"Fantasy sports connectors" are software connectors between method steps or system elements in the embodiments that can integrate fantasy sports. Fantasy sports allow a competition in which participants select imaginary teams from among the players in a league and score points according to the actual performance of their players. For example, if a player in fantasy sports is playing at a given real-time sport, odds could be changed in the real-time sports for that player.

Software as a service (or SaaS) is a software delivery and licensing method in which software is accessed online via a subscription rather than bought and installed on individual computers. SaaS can be integrated into the embodiments in a variety of manners.

Synchronization of screens means synchronizing bets and results between devices, such as TV and mobile, PC, and wearables. Synchronization of screens can be integrated into the embodiments in a variety of manners.

Automatic content recognition (ACR) is an identification technology that recognizes content played on a media device or present in a media file. Devices containing ACR support, enable users to quickly obtain additional information about the content they see without any user-based input or search efforts. A short media clip (audio, video, or both) is selected to start the recognition. This clip could be selected from within a media file or recorded by a device. Through algorithms such as fingerprinting, information from the actual perceptual content is taken and compared to a reference fingerprint database, wherein each reference fingerprint corresponds with a known recorded work. A database may contain metadata about the work and associated information, including complementary media. If the media clip's fingerprint is matched, the identification software returns the corresponding metadata to the client application. For example, during an in-play sports game, a "fumble" could be recognized and at the time stamp of the event, metadata such as "fumble" could be displayed. ACR can be integrated into the embodiments in a variety of manners.

Joining social media means connecting an in-play sports game bet or result to a social media connection, such as FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real-time view of the game can be seen and a "bet"—which is a computer-generated data point—is placed above the player that is bet on. Augmented reality can be integrated into the embodiments in a variety of manners.

Some embodiments of this disclosure, illustrating all its features, will now be discussed in detail. It can be understood that the embodiments are intended to be open-ended in that an item or items used in the embodiments is not meant to be an exhaustive listing of such item or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for an at-bat/per drive wagering. This system may include a live event 102, for example, a sporting event such as a football, basketball, baseball, or hockey game, tennis match, golf tournament, eSports, or digital game, etc. The live event 102 may include some number of actions or plays upon which a user, bettor, or customer can place a bet or wager, typically through an entity called a sportsbook. There are numerous types of wagers the bettor can make, including, but not limited to, a straight bet, a money line bet, or a bet with a point spread or line that the bettor's team would need to cover if the result of the game with the same as the point spread the user would not cover the spread, but instead the tie is called a push. If the user bets on the favorite, points are given to the opposing side, which is the underdog or longshot. Betting on all favorites is referred to as chalk and is typically applied to round-robin or other tournaments' styles. There are other types of wagers, including, but not limited to parlays, teasers, and prop bets, which are added games that often allow the user to customize their betting by changing the odds and payouts received on a wager. Certain sportsbooks will allow the bettor to buy points which moves the point spread off the opening line. This increases the price of the bet, sometimes by increasing the juice, vig, or hold that the sportsbook takes. Another type of wager the bettor can make is an over/under, in which the user bets over or under a total for the live event 102, such as the score of an American football game or the run line in a baseball game, or a series of actions in the live event 102. Sportsbooks have several bets they can handle, limiting the number of wagers they can take on either side of a bet before they will move the line or odds off the opening line. Additionally, there are circumstances, such as an injury to an important player like a listed pitcher, in which a sportsbook, casino, or racino may take an available wager off the board. As the line moves, an opportunity may arise for a bettor to bet on both sides at different point spreads to middle, and win, both bets. Sportsbooks will often offer bets on portions of games, such as first-half bets and half-time bets. Additionally, the sportsbook can offer futures bets on live events in the future. Sportsbooks need to offer payment processing services to cash out customers, which can be done at kiosks at the live event 102 or at another location.

Further, embodiments may include a plurality of sensors 104 that may be used such as motion, temperature, or humidity sensors, optical sensors and cameras such as an RGB-D camera which is a digital camera capable of capturing color (RGB) and depth information for every pixel in an image, microphones, radiofrequency receivers, thermal imagers, radar devices, lidar devices, ultrasound devices, speakers, wearable devices, etc. Also, the plurality of sensors 104 may include but are not limited to, tracking devices, such as RFID tags, GPS chips, or other such devices embedded on uniforms, in equipment, in the field of play and boundaries of the field of play, or on other markers in the field of play. Imaging devices may also be used as tracking devices, such as player tracking, which provide statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as visible light communication (VLC), worldwide interoperability for microwave access (WiMAX), long term evolution (LTE), wireless local area network (WLAN), infrared (IR) communication, public switched telephone network (PSTN), radio waves, or other communication techniques that are known in the art. The communication network may allow ubiquitous access to shared pools of configurable system resources and higher-level services that can be rapidly provisioned with minimal management effort, often over the internet, and relies on sharing resources to achieve coherence and economies of scale, like a public utility. In contrast, third-party clouds allow organizations to focus on their core businesses instead of expending resources on computer infrastructure and maintenance. The cloud 106 may be communicatively coupled to a peer-to-peer wagering network 114, which may perform real-time analysis on the type of play and the result of the play. The cloud 106 may also be synchronized with game situational data such as the time of the game, the score, location on the field, weather conditions, and the like, which may affect the choice of play utilized. For example, in an exemplary embodiment, the cloud 106 may not receive data gathered from the sensors 104 and may, instead, receive data from an alternative data feed, such as Sports Radar®. This data may be compiled substantially immediately following the completion of any play and may be compared with a variety of team data and league data based on various elements, including the current down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include but are not limited to keyboards, mice, trackpads, trackballs, touchpads, touch mice, multi-touch touchpads and touch mice, microphones, multi-array microphones, drawing tablets, cameras, single-lens reflex cameras (SLRs), digital SLRs (DSLRs), complementary metal-oxide-semiconductor (CMOS) sensors, accelerometers, IR optical sensors, pressure sensors, magnetometer sensors, angular rate sensors, depth sensors, proximity sensors, ambient light sensors, gyroscopic sensors, or other sensors. Output devices may include but are not limited to video displays, graphical displays, speakers, headphones, inkjet printers, laser printers, or 3D printers. Devices may include but are not limited to a combination of multiple inputs or output devices such as Microsoft KINECT, Nintendo Wii remote, Nintendo WII U GAMEPAD, or Apple iPhone. Some devices allow gesture recognition inputs by combining input and output devices. Other devices allow for facial recognition, which may be utilized as an input for different purposes such as authentication or other commands. Some devices provide for voice recognition and inputs, including, but not limited to, Microsoft KINECT, SIRI for iPhone by Apple, Google Now, or Google Voice Search. Additional user devices have both input and output capabilities, including but not limited to, haptic feedback devices, touchscreen displays, or multi-touch displays. Touchscreen, multi-touch displays, touchpads, touch mice, or other touch sensing devices may use different technologies to sense touch, including but not limited to, capacitive, surface capacitive, projected capacitive touch (PCT), in-cell capacitive, resistive, IR, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, but not limited to, pinch, spread, rotate, scroll, or other gestures. Some touchscreen devices, including but not limited to, Microsoft PIXELSENSE or Multi-Touch Collaboration Wall, may have larger surfaces, such as on a table-top or on a wall, and may also interact with other electronic devices. Some I/O devices, display devices, or groups of devices may be augmented reality devices. An I/O controller may control one or more I/O devices, such as a keyboard and a pointing device or a mouse or optical pen. Furthermore, an I/O device may also contain storage and/or an installation medium for the computing device. In some embodiments, the computing device may include USB connections (not shown) to receive handheld USB storage devices. In further embodiments, an I/O device may be a bridge between the system bus and an external communication bus, e.g., USB, SCSI, FireWire, Ethernet, Gigabit Ethernet, Fiber Channel, or Thunderbolt buses. In some embodiments, the mobile device 108 could be an optional component and would be utilized in a situation where a paired wearable device employs the mobile device 108 for additional memory or computing power or connection to the internet.

Further, embodiments may include a wagering software application or a wagering app 110, which is a program that enables the user to place bets on individual plays in the live event 102, streams audio and video from the live event 102, and features the available wagers from the live event 102 on the mobile device 108. The wagering app 110 allows the user to interact with the wagering network 114 to place bets and provide payment/receive funds based on wager outcomes.

Further, embodiments may include a mobile device database 112 that may store some or all the user's data, the live event 102, or the user's interaction with the wagering network 114.

Further, embodiments may include the wagering network 114, which may perform real-time analysis on the type of play and the result of a play or action. The wagering network 114 (or the cloud 106) may also be synchronized with game situational data, such as the time of the game, the score, location on the field, weather conditions, and the like, which may affect the choice of play utilized. For example, in an exemplary embodiment, the wagering network 114 may not receive data gathered from the sensors 104 and may, instead, receive data from an alternative data feed, such as SportsRadar®. This data may be provided substantially immediately following the completion of any play and may be compared with a variety of team data and league data based on a variety of elements, including the current down, possession, score, time, team, and so forth, as described in various exemplary embodiments herein. The wagering network 114 can offer several SaaS managed services such as user interface service, risk management service, compliance, pricing and trading service, IT support of the technology platform, business applications, game configuration, state-based integration, fantasy sports connection, integration to allow the joining of social media, or marketing support services that can deliver engaging promotions to the user.

Further, embodiments may include a user database 116, which may contain data relevant to all users of the wagering network 114 and may include but is not limited to, a user ID, a device identifier, a paired device identifier, wagering history, or wallet information for the user. The user database 116 may also contain a list of user account records associated with respective user IDs. For example, a user account record may include, but is not limited to, information such as user interests, user personal details such as age, mobile number, etc., previously played sporting events, highest wager, favorite sporting event, or current user balance and standings. In addition, the user database 116 may contain betting lines and search queries. The user database 116 may be searched based on a search criterion received from the user. Each betting line may include but is not limited to, a plurality of betting attributes such as at least one of the live event 102, a team, a player, an amount of wager, etc. The user database 116 may include but is not limited to information related to all the users involved in the live event 102. In one exemplary embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user, etc.

Further, embodiments may include a historical plays database 118 that may contain play data for the type of sport being played in the live event 102. For example, in American Football, for optimal odds calculation, the historical play data may include metadata about the historical plays, such as time, location, weather, previous plays, opponent, physiological data, etc.

Further, embodiments may utilize an odds database 120—that contains the odds calculated by an odds calculation module 122—to display the odds on the user's mobile device 108 and take bets from the user through the mobile device wagering app 110.

Further, Embodiments May Include the Odds Calculation Module 122, which Utilizes Historical Play Data to Calculate Odds for In-Play Wagers.

Further, embodiments may include a next plays wager module 124, which may allow users to place bets on the number of plays that may occur before a sub-event of the live event 102. A sub-event may be any event that occurs within the live event 102, such as changing of the inning, switching from offense to defense, scoring points, a timeout is called, the end of the live event 102, etc. For example, a user may be able to place a wager on the number of plays before the end of a drive-in American Football. Sub-events do not need to be part of the game rules; for example, a user might be able to bet on how may plays before an injury occurs or before a commercial break. The next plays wager module 124 calculates odds based on data in the historical plays database 118.

Further, embodiments may include a player lineup database 126, which may contain the order in which players participate in the live event 102. For example, in baseball, the order of batters is known ahead of time, with some chance of substitution. This data may be used by the next plays wager module 124 to determine odds for plays that may happen in the future.

FIG. 2 illustrates a next plays wager module 124. The process may begin with the next plays wager module 124 polling, at step 200, for a new play of the live event 102. This data may be obtained from the sensors 104 at the live event 102. The next plays wager module 124, may receive, at step 202, play data from the sensors 104 at the live event 102. Play data may include the details of the current play, such as which players are on the field, the state of the live event 102, the weather, the previous play, wind vector, the team on offense or defense, etc. The next plays wager module 124 may determine, at step 204, the next sub-event of the live event 102. A sub-event may be, for example, an out in baseball, a 4th down in American football, the end of a subdivision of the live event 102, such as a quarter, inning, or timeout, etc. The sub-events included may be set by an administrator. Multiple sub-events may be determined simultaneously, for example, the next timeout and the end of the next inning. In this case, multiple iterations of the next plays wager module 124 may run for each determined sub-event. The next plays wager module 124, may search, at step 206, the historical plays database 118 for similar plays occurring during the live event. A similar play may not have to be an exact match. For example, two plays with the same team and players may be similar even though the weather may differ. An administrator of the system or another module may adjust which plays are considered similar. The next plays wager module 124, may calculate, at step 208, odds that the sub-event occurs during or after the play based on the extracted similar plays from the historical plays database 118. For example, if 100 similar plays are extracted and 27 of those plays resulted in the end of the inning with the other 73 resulting in the inning continuing, the odds for the outcome of the play to be the end of the inning may be calculated to be 27%. The next plays wager module 124, may determine, at step 210, if it is almost certain that the sub-event will occur during or after the play. The certainty that a sub-event may occur may be determined by checking if the calculated odds of the sub-event occurring are above 99%. This threshold may be different than 99%, static or dynamic, or set by an administrator or another module. If the threshold is met, the next plays wager module 124 may skip to step 216. If the threshold is not met, the next plays wager module 124, may assume, at step 212, that the sub-event does not occur and simulate the next play of the live event 102. For example, if the live event 102 is a baseball game with the current state of the game in the bottom of the 3rd inning with two outs, the sub-event may be the end of the inning. Assuming the outcome of the current play is a third out, the inning would end. The simulated play may then be based on how the state of the game would have been had there not been a third out. The simulated play may be generated by assuming the most likely outcome that does not result in the sub-event. The next plays wager module 124, may generate a simulated play for each outcome that does not result in the sub-event. For example, the sub-event is the end of an inning, but a single, double, home run, or walk occurs, causing some alternative outcome to occur instead of the inning ending. These alternatives may each then be used to generate a separate simulated state of the live event 102. The next plays wager module 124, may use data in the player lineup database 126 to predict which players may be part of the next play of the live event 102. The next plays wager module 124, may then return, at step 214, to step 206 with the simulated play selected. If more than one simulated play is generated in step 212, each simulated play may simultaneously be selected and run through another iteration of the next plays wager module 124. The next plays wager module may select the next simulated play that has not yet had odds calculated. If it is almost certain that the sub-event will occur during or after the play, at step 210, the next plays wager module 124 may calculate, at step 216, the cumulative odds of the sub-event occurring for each simulated play. The cumulative odds may be the odds that a sub-event occurs several plays from the current state of the live event 102. For example, the live event 102 may be a baseball game with the current state of the game in the bottom of the 3rd inning, with two outs, and Cedric Mullins at-bat. The sub-event may be the end of the inning and if the outcome of the current play results in a third out, the inning would end. The odds of a third out being the outcome of the current play may be calculated to be 60%. Next, assume the current play does not result in a third out—a 40% chance—causing the next batter in the lineup to be up to bat. The next plays wager module 124, may then simulate the following play with the next batter in the player lineup database 126, Austin Hays, at-bat. The odds of a third out being the outcome of the simulated next play may be calculated to be 50%. Finally, the next plays wager module 124 may then calculate the odds for the inning-ending to occur exactly two batters from the current state of the live event 102. This is done by taking the odds that the current play does not result in the end of the inning, or 40%, multiplied by the odds that the simulated play does result in the end of the inning, or 50%, arriving at 20%. Note that this calculation may be used to determine the odds of the sub-event occurring 2, 3, 4, etc. plays from the current state of the live event 102. In baseball, the upcoming batter may be substituted for several plays because the batting lineup is already known. For example, the user may be able to bet on whether Austin Hays or Trey Mancini will bat this inning. Odds may also be calculated for the sub-event occurring in a group of plays. For example, if the game is American football, users may be able to bet if a drive will end in less than four plays, exactly four plays, or more than four plays. The next plays wager module 124 may send, at step 218, the odds and wagers for each option to the mobile device 108. The user may then use the wagering app 110 on the mobile device 108 to place a wager. Wager options may be all or a subset of the possible number of plays before the sub-event occurs. For example, the user may wager on 1, 2, 3, or 4+ plays before the next touchdown in an American football game. The odds may be adjusted from the calculated odds to account for factors such as risk and profit. The next plays wager module 124 may poll, at step 220, for wager data from the mobile device 108. This wager data may correspond to a wager being placed by a user. The wager data may also correspond to the wagering window closing. The next plays wager module 124 may store, at step 222, the wagering data in the user database 116. If the wagering data corresponds to the wagering window closing before the user submitted a wager, this step may be skipped. The next plays wager module 124 may return, at step 224, to step 200.

FIG. 3 illustrates a player lineup database 126. The player lineup database 126 may contain data on the order in which players take part in plays of the live event 102. The player lineup database 126 may include a player's position in the lineup or lineup number. This lineup number may correspond to the order in which the players may play during the live event 102. For example, the player lineup number may refer to the batting order in a baseball game. The player lineup database 126 may include the player's name or another identifier for the player. The player lineup database 126 may include a different database on game type. For example, in American football, players do not have to appear in each play in order. In this case, the player lineup database 126 may include the odds that a player will participate in the next play based on historical data.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for offering play count wagers in a play-by-play sports betting network, comprising:
- collecting real-time sensor data from a live event;
- extracting historical data similar to the real-time sensor data from a historical database;
- calculating the probability of at least one sub-event occurring during at least one action in the live event based off the historical data and real-time sensor data;
- determining that the at least one sub-event will occur during the at least one action in the live event;
- determining odds for each outcome that does not result in at least one sub-event during the live event;
- calculating cumulative odds of whether one or more of the at least one sub-events will occur two or more actions in the future in the live event; and
- outputting a wager on a wagering device that is communicatively coupled to a wagering network, wherein the wager outputted on the wagering device is a wager on whether one or more of the at least one sub-events will occur during the at least one action in the live event.

2. The method for offering play count wagers in a play-by-play sports betting network of claim 1, wherein determining odds for each outcome that does not result in at least one sub-event comprises;
- generating a simulated play for each outcome that does not result in at least one sub-event occurring during the live event.

3. The method for offering play count wagers in a play-by-play sports betting network of claim 2, further comprising determining that the at least one sub-event will occur by calculating a 99% likelihood of the at least one sub-event occurring.

4. The method for offering play count wagers in a play-by-play sports betting network of claim 2, further comprising predicting which players may be part of the next play using the simulated play and data from a player lineup database.

5. The method for offering play count wagers in a play-by-play sports betting network of claim 1, wherein the wager placed on the wagering device is a wager on whether at least one sub-event will occur within a specified number of actions.

6. The method for offering play count wagers in a play-by-play sports betting network of claim 1, further comprising:
- determining odds for an at least second sub-event during the live event;
- wherein upon the as least one sub-event occurring, the at least second sub-event occurs thereafter; and
- the wager outputted on the wagering device is a wager on whether the at least second sub-event will occur during the at least one action in the live event.

7. The method for offering play count wagers in a play-by-play sports betting network of claim 1, wherein the actions in the live event are plays in a live sporting game.

8. A system for offering play count wagers in a play-by-play sports betting network, comprising:
- a live event upon which play-by-play wagers can be placed;
- one or more sensors that collect data from the live event;
- at least one wagering device;
- a wagering network communicatively coupled with the at least one wagering device;
- a historical plays database which contains play data for the type of sport being played in the live sporting event;

a player lineup database which contains data on an order in which players take part in plays of the live sporting event, wherein the data on the players taking part in the plays of the live sporting event, historical play data, and real-time data are processed by a next plays wager module; and the next plays wager module is configured to:

calculate the probability of at least one sub-event occurring during at least one action in the live event based off historical play data and real-time sensor data; and calculates cumulative odds of whether one or more of the at least one sub-events will occur two or more actions in the future in the live event;

wherein a wager can be placed on the at least one wagering device communicatively coupled with the wagering network on whether one or more of the at least one sub-events will occur during the at least one action in the live event; and when the next plays wager module determines that at least one-sub event will occur during the at least one action in the live event, the next plays wager module generates a simulated play for each outcome that does not result in at least one sub-event occurring during the live event.

9. The system for offering play count wagers in a play-by-play sports betting network of claim 8, wherein the wager placed on the wagering device is a wager on whether at least one sub-event will occur within a specified number of actions.

10. The system for offering play count wagers in a play-by-play sports betting network of claim 8, wherein it is determined that the at least one sub-event will occur when there is a calculation of a 99% likelihood of the sub-event occurring.

11. The system for offering play count wagers in a play-by-play sports betting network of claim 8, wherein the next plays wager module predicts which players may be part of the next action using the simulated play and data from the player lineup database.

12. The system for offering play count wagers in a play-by-play sports betting network of claim 8, wherein the next plays wager module is further configured to determine odds for an at least second sub-event during the live event;

wherein upon the as least one sub-event occurring, the at least second sub-event occurs thereafter, and the wager outputted on the wagering device is a wager on whether the at least second sub-event will occur during the at least one action in the live event.

13. The system for offering play count wagers in a play-by-play sports betting network of claim 8, wherein the actions in the live event are plays in a live sporting game.

* * * * *